US008321891B2

(12) United States Patent
Schlarb et al.

(10) Patent No.: US 8,321,891 B2
(45) Date of Patent: Nov. 27, 2012

(54) METHOD AND SYSTEM FOR ASSIGNING CATEGORIES TO CHANNELS IN A SUBSCRIBER TELEVISION SYSTEM

(76) Inventors: John M. Schlarb, Alpharetta, GA (US); Arturo A. Rodriguez, Norcross, GA (US)

( * ) Notice: Subject to any disclaimer, the term of this patent is extended or adjusted under 35 U.S.C. 154(b) by 219 days.

(21) Appl. No.: 12/351,254

(22) Filed: Jan. 9, 2009

(65) Prior Publication Data
US 2009/0119714 A1 May 7, 2009

Related U.S. Application Data

(60) Division of application No. 09/709,167, filed on Nov. 10, 2000, which is a continuation-in-part of application No. 09/071,602, filed on May 1, 1998, now Pat. No. 6,243,145.

(51) Int. Cl.
*H04N 5/445* (2006.01)
*G06F 3/00* (2006.01)
*G06F 13/00* (2006.01)

(52) U.S. Cl. ............... 725/45; 725/40; 725/46; 725/47; 725/50; 725/52; 725/56; 725/61

(58) Field of Classification Search .............. 725/40, 725/44–47, 50, 52, 56, 61
See application file for complete search history.

(56) References Cited

U.S. PATENT DOCUMENTS

| | | | | |
|---|---|---|---|---|
| 5,296,931 A | * | 3/1994 | Na | 725/38 |
| 5,477,262 A | * | 12/1995 | Banker et al. | 725/38 |
| 5,532,754 A | * | 7/1996 | Young et al. | 725/47 |
| 5,585,866 A | * | 12/1996 | Miller et al. | 725/43 |
| 5,589,892 A | | 12/1996 | Knee et al. | |
| 5,619,249 A | * | 4/1997 | Billock et al. | 725/5 |
| 6,005,631 A | * | 12/1999 | Anderson et al. | 725/53 |
| 6,163,345 A | * | 12/2000 | Noguchi et al. | 348/564 |
| 6,230,323 B1 | * | 5/2001 | Hama et al. | 725/47 |
| 6,243,145 B1 | | 6/2001 | Schlarb et al. | 348/906 |
| 6,445,306 B1 | | 9/2002 | Trovato et al. | |
| 6,445,754 B1 | * | 9/2002 | Itoi | 375/341 |

(Continued)

FOREIGN PATENT DOCUMENTS

| | | |
|---|---|---|
| EP | 0 790 738 A2 | 8/1997 |
| WO | WO 97/49242 | 12/1997 |

OTHER PUBLICATIONS

U.S. Official Action mailed Jan. 7, 2009 in U.S. Appl. No. 09/709,167.

(Continued)

*Primary Examiner* — Jason Salce
(74) *Attorney, Agent, or Firm* — Merchant & Gould (57) ABSTRACT

In a subscriber television system, assigning categories to a channel as an entity reduces the searching requirements associated with searching a database of thousands of individual program records, identifying the channel on which an identified program will be displayed, and then sorting the resultant information. The channel information is searched for the assigned category information and the associated program information for just those channels is retrieved. This reduces the processor requirements for searching the thousands of records in the program records database. With the reduced processor requirements and the increased efficiency of information organization for searching, a single machine state change is possible between viewing full screen video and a browse banner or between viewing full screen program information and video with a browse banner.

11 Claims, 9 Drawing Sheets

U.S. PATENT DOCUMENTS 6,760,537 B2 * 7/2004 Mankovitz ............... 386/83
2009/0119713 A1 5/2009 Schlarb et al. ............ 725/47

OTHER PUBLICATIONS

U.S. Official Action mailed Aug. 11, 2009 in U.S. Appl. No. 09/709,167.

U.S. Official Action mailed Jan. 22, 2010 in U.S. Appl. No. 09/709,167.

U.S. Official Action mailed Mar. 12, 2010 in U.S. Appl. No. 12/351,256.

U.S. Final Official Action mailed Oct. 1, 2010 in U.S. Appl. No. 12/351,256, 14 pages.

* cited by examiner

METHOD AND SYSTEM FOR ASSIGNING CATEGORIES TO CHANNELS IN A SUBSCRIBER TELEVISION SYSTEM

CROSS-REFERENCE TO RELATED APPLICATIONS

The present application is a divisional of U.S. patent application Ser. No. 09/709,167, Schlarb et al., entitled Method and Apparatus for Browsing Television Program Information by Categories Assigned to Channels, filed 10 Nov. 2000, which is a continuation-in-part of U.S. patent application Ser. No. 09/071,602, Schlarb et al., entitled Method and Apparatus for Browsing Television Channel Information by Category, filed 1 May 1998, both of which are incorporated herein by reference in their entirety.

FIELD OF THE INVENTION

This invention relates generally to controlling the display of program guide information in a subscriber television system, and more specifically to organizing the program information by categories assigned to the television channels.

BACKGROUND OF THE INVENTION

Subscriber television systems transmit to system subscribers a plurality of signals, including television programming and other services. Subscriber television systems typically include a headend for organizing and processing the signals and then transmitting the signals via a communication medium to subscriber equipment that tunes to television channels for displaying television programming to the subscriber. The signals to the subscriber can be transmitted, for instance, over coaxial cables, fiber optic cables, a hybrid fiber-coax, or a satellite. Signals to a subscriber can be provided directly to a cable-ready television, a cable-ready videocassette recorder (VCR), or a set top terminal connected to a television or other display device, such as a computer.

Many subscriber television systems provide television program information describing the programs and times the programs will be shown. The program information is organized into individual program records, one for each program, and these records are maintained in a program information database. The database is typically stored in the subscriber equipment to allow the subscriber to quickly and easily access the program information. There is an individual record for every program to be shown on every channel during a specific time period for which the information is provided. The time period is based on the memory available to store the database and may include days or months of program information. The program records describe a multitude of attributes for each and every program. The attributes for each individual program can include the program name, a description of the program, content rating (G, PG, R, etc.), viewing times, and one or more related content categories for the program (e.g., Sports, Movies, Family, etc.).

This program information is typically organized for presentation purposes into a program guide format that presents the program information for the programs by the time when, and channel on which, they will be displayed. This allows the subscriber to scan the available programs and decide which of the available programs to watch. For example, a program guide can be scrolled through in numerical order by television channel, presenting the program information for the programs available on each channel. Another method of viewing the program information is with the use of a browser. A browser displays program information in a portion of the display screen, while continuing to display video in the remainder of the display screen. With a browser a subscriber can linearly scan program information by time and channel while continuing to view the video of the program on the currently tuned channel.

In systems that offer a relatively small number of television channels, the subscriber can easily scan the available programs one-by-one in order of channel number. However, many systems can provide hundreds or even thousands of channels. In such systems, scanning program information by channel number one-by-one can require hundreds or thousands of keystrokes and can consume a tremendous amount of time. Furthermore, locating a particular channel can be quite difficult if the subscriber does not already know the channel number of the channel for which he or she is searching.

Current methods of organizing the program information include providing, or allowing the subscriber to select, subsets of the program information to be displayed and viewed. Channels can be assigned to a "Favorite" category and then only program information for the selected channels will be displayed. Subscribers can select to only view program information for programs with a particular attribute. To provide a user with a listing of all of the individual programs on a selected channel or with a certain attribute requires searching all of the individual records in the database to find the program records that contain the desired attribute. For example, to provide a subscriber with a listing of every program with a "G" rating would require searching every program record in the database for the "G" ratings attribute. Searching an entire program information database requires the settop terminal's microprocessor to execute a lot of processor cycles. This can produce a noticeable latency or slowed response to the subscriber because of the number of processor cycles required to completely search the entire program information database, organize the results, and then display the results. In systems with browsers, this can have even more of an impact as the same processor may be processing the video and searching the program information database simultaneously. Searching a database of program records is further complicated by the fact that a program record can include a variable number of fields with variable sizes. Searching through variable sized records requires more processor cycles than searching fixed size records.

Systems have been developed with a multiple modes or machine states to help control the processing cycle requirements on the processor. A machine state describes the current operating state of a component that is capable of functioning in multiple states to perform different tasks. For example, a menu mode is a separate machine state from a view video mode. This allows the processor to use the processor cycles required for searching the program information database without being required to simultaneously process video. The search results can be stored. After switching modes, the search results can be retrieved in the view video mode to support browsing program information while viewing video without requiring a simultaneous search of the program information database. The menu mode still requires searching the entire program information database and the subscriber must switch between modes to select and update the sub-set of program information that they desire to view.

What is needed is an improved way to organize and search program information in a subscriber television system.

DETAILED DESCRIPTION

The present invention is directed to a simple and efficient method and apparatus for improving the way program information is searched and organized in a subscriber television system. Assigning categories to channels provides simple organization of, and efficient access to, the program information. Searching for program information is done on the relatively small number of program records in the database related to the channel to which a chosen category has been assigned. This is compared to searching the huge number of program records for every program on every channel for hours, days, weeks, or months associated with current methods.

Current methods assign categories to individual programs and in some cases allow channels to be assigned to categories. To display program information for a subset of the programs requires searching the entire database of program records for program records that have the desired category or attribute. Searching is often done in a menu text-type mode without video display so that the processor resources are freed from controlling and processing video and can be used to search the database in a timely manner. The menu mode methods, after finding and organizing the desired information, then switch back to a video display mode and recall the resultant search information from a short-term memory for display in a browse banner.

The present invention's increased efficiency and reduced processor requirements allow the simultaneous display of video and the searching for and displaying of the programming information for channels to which a desired category has been assigned.

An embodiment of the present invention includes a channel table with one entry per channel. Each channel's entry in the channel table is indexed by employing the channel number. Each entry in the channel table provides an efficient representation of one or more categories assigned to the respective channel. Tables for each individual channel category can be constructed in advance by searching the channel table for a category and storing the resulting list of related channels to which that category has been assigned. In addition, updating a channel table associated with the changing, deleting, renaming, or adding of categories assigned to a channel is simpler than updating an entire program record database. A terminal of the present invention stores and uses the table and associates the categories assigned to the channels to simply and efficiently control the searching and display of the program information. Organizing the program records of the program information database by channel provides additional searching efficiencies. For example, a first search of the channel table for channels that have been assigned a category and then searching the program records associated with the resultant channels requires fewer processor cycles than a search of the thousands of program records in the entire database.

In one embodiment of the present invention, the channel table is designed with fixed-sized entries. The entries can be organized with entries for adjacent channels stored contiguously. The processor can retrieve large contiguous sections of the channel table, possibly the entire table. This maximizes the efficiency of the processor executing a search.

In another embodiment, searching the channel information of the present invention, as opposed to the entire database, allows a single machine state transition from a machine state that functions to display full screen video to a machine state that includes browsing program information in a browse banner that is displayed with the video. A machine state describes the current operating state of a component that is capable of functioning in multiple states to perform different tasks. Other prior methods required an intermediate "Flip" state to allow for the searching and loading of the program records database between the state of viewing the full-screen video and the browsing state. With the simultaneous searching and video display of the present invention, there is no requirement to change to an intermediate machine state between a machine state of searching program information and a machine state of viewing video.

In another embodiment, displaying a category banner is also invoked as a single machine state transition. A category banner can indicate the current category, display a listing of the categories, and allow the subscriber to select and change categories. With categories assigned to channels, fewer processor cycles are required to perform a search for related program information. This enables the simultaneous display of video. In addition, switching the display from program information related to a first category to that related to a second category can be done based on searching the channel information, such as a channel table or a previously stored table of category related channels to which the second category has been assigned. The efficiency and reduced search requirements of the present invention allow the switching of categories while in a view video machine state, without changing to a menu mode machine state. A subscriber can easily select another category and view that program information without switching out of the view video mode to a menu mode, selecting another category, and then switching back to the view video mode.

The channel table of the present invention can be used in conjunction with the existing methods of content searching a program record database. The search can be narrowed via the use of the channel table to only program records associated with channels to which an associated category has been assigned in advance. This reduces the processor resources required for searching. The combination would search only the program records associated with the channels assigned the associated category, not the entire program record database.

The present invention is best understood within the context of a subscriber television system. Referring now to drawings in which like numerals represent like elements throughout the several figures, a subscriber television system and additional exemplary embodiments of the present invention will be described.

Figure 1:
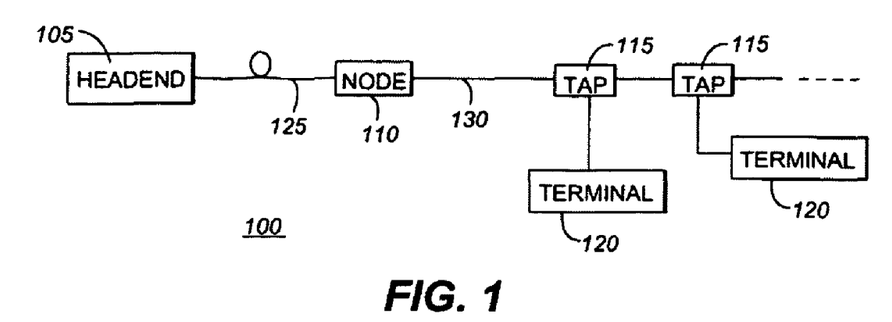
FIG. 1 is a block diagram of a subscriber television system.

FIG. 1 is a simplified block diagram of a subscriber television system 100 including a headend 105 for organizing television signals and transmitting the signals over the system 100. The transmitted signals can, for instance, be radio frequency (RF) signals, although they are more preferably optical signals that are transmitted over a communication medium such as fiber optic cable 125. When optical signals are transmitted by the headend 105, one or more nodes 110 may be included in the system 100 for converting the optical signals to RF signals that are thereafter routed over other media, such as coaxial cables 130. Taps 115 are provided within the cable system 100 for splitting the RF signal off to subscriber equipment, such as set top terminals 120, cable-ready televisions, video cassette recorders (VCRs), or computers.

Figure 2:
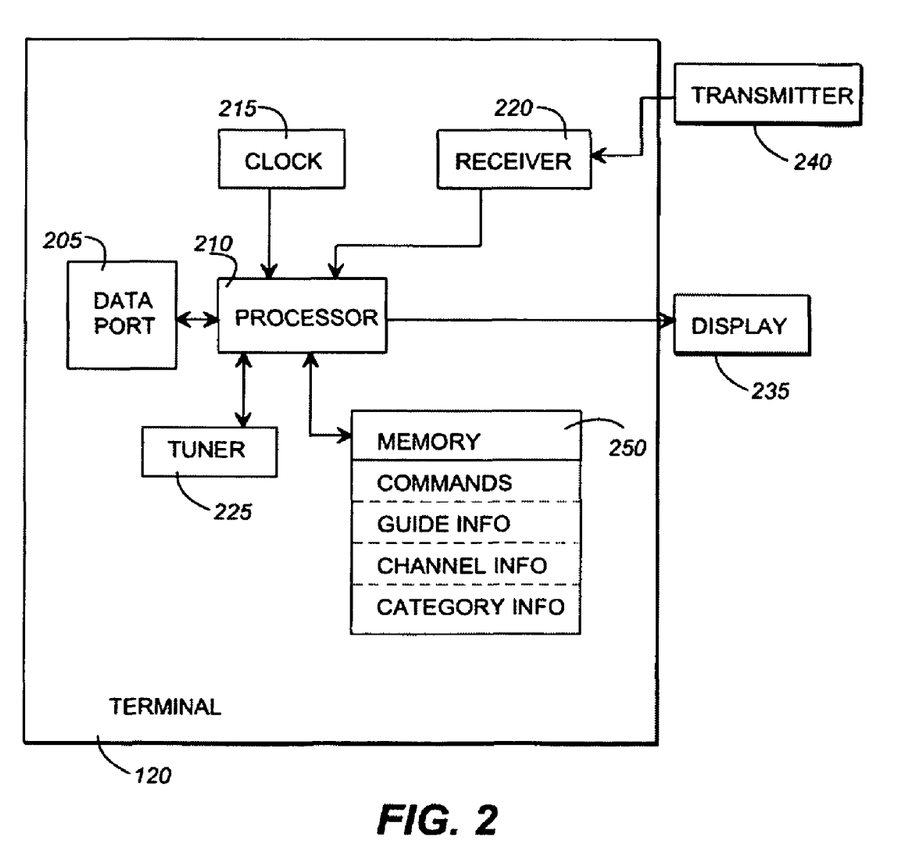
FIG. 2 is a simplified block diagram of a set top terminal.

Referring next to FIG. 2, a simplified block diagram of the terminal 120 also known as a Home Communications Terminal (HCT). Those skilled in the art will recognize that the simplified block diagram of FIG. 2 is a generalization of the elements, functions, and inner connections of a subscriber terminal and is used only to illustrate the present invention within the general concepts of a subscriber terminal. For example, the processor 210 of FIG. 2 could include multiple decoders and a central processing unit (CPU), with the CPU including an arithmetic logic unit (ALU), a data cache, and an instructions cache. The present invention functions with a wide variety of processor combinations and design choices well known to those skilled in the art. The terminal 120 is typically situated within the residence or business of the subscriber. It may be integrated into a device that has a display 235, such as a television set, or it may be a stand-alone unit that couples to an external display 235, such as a display included in a computer or a television, and that processes television signals for presentation to a subscriber on the display 235. The terminal 120 preferably comprises a data port 205 for receiving the RF signals, which can include video, audio, and data information, from the tap 115 (FIG. 1) and for providing any reverse information to the tap 115 for transmission back to the headend 105. As mentioned above, the terminal 120 includes a processor 210 for controlling operations of the terminal 120, decoding the incoming signals, and for driving the display 235. The terminal 120 further includes a clock 215 for providing timing functions, and a tuner 225 for tuning into a particular television channel to be displayed. Advanced terminals may include multiple tuners. Additionally, the terminal 120 includes a receiver 220 for receiving externally generated information, such as user inputs or commands from other devices. User inputs could, for example, be provided via a wired or wireless controller or transmitter 240, such as buttons or keys located on the exterior of the terminal 120, on a keyboard, or on a handheld remote control device that includes user-actuated buttons.

A memory 250 coupled to the processor 210 stores operational parameters and executable programs, such as commands that are recognized by the processor 210. The memory 250 could be a single memory type, such as a non-volatile random access memory (NVRAM) or a random access memory (RAM), or combination of different memory elements, such as an NVRAM and a read-only memory (ROM). The memory 250 stores program information that can, for instance, be downloaded over the system 100 (FIG. 1) to the terminal 120. The program information includes program guide information that is displayed to the subscriber in the format of a program guide including a listing of channels, programs for viewing on the channels, and times during which the programs are shown. The program information includes a database of program records for each individual program that could be viewed during a certain time period.

A program record is comprised of a plurality of fields, with fixed-sized fields and variable-sized fields. Fixed-sized fields include four-digit display time fields. The variable sized fields include program description fields that include a limited amount of text to describe a news program and a large amount of text to describe a movie. In addition, the number of fields in each program record can be different and thus the overall number of bytes for each record is typically different. The program records includes information, such as the channel number, channel icons, and identification information (e.g., ESPN, Disney, WXIA, etc.).

According to an embodiment of the present invention, the program information additionally includes channel information that indicates the categories assigned to the channels. By way of example, categories could include ALL, assigned to all available channels; SPORTS, assigned to sports and fitness channels; FAMILY, assigned to channels that provide family oriented programming; ADULT, assigned to channels providing adult programming; FOOD, assigned to channels that provide programs on cooking, food, and restaurants; LOCAL, assigned to the channels that originate in the geographic region of the subscriber television system 100; and any other categories that could be of interest to the subscriber. A FAVORITES category and categories that the subscriber names could also be provided in systems 100 that permit the subscriber to assign categories to subscriber selected channels. Furthermore, channels could have more than one category assigned to them, e.g., a channel originating in the local geographic region of the system 100 could be assigned the categories of LOCAL, SPORTS, NEWS, FAMILY, and ENTERTAINMENT. Channels that have several different types of programming on them and can be assigned multiple categories for the different types of programming they include. Multiple and more precise categories can be implemented, such as refining the SPORTS category into GOLF, BASEBALL, BASKETBALL, and FOOTBALL categories. FOOTBALL could be further refined into PROFESSIONAL FOOTBALL and COLLEGE FOOTBALL categories. The binary number representing the categories assigned to a channel can be adjusted to provide the number of bytes required to support the number of categories the system operator designates.

Typically, the terminal 120 periodically downloads program information through a communications or network interface, such as data port 205, into memory 250 from the headend 105 (FIG. 1). The program information including at least programs and times by channel and channel information. Other methods of delivering the program information can also be used, such as systems with the program information stored at headend 105 or the program information can be downloaded from a transportable data source, from a computer network such as an Ethernet network or token ring, or from a telephone line connected to the terminal. It will be appreciated that the amount of this information that can be downloaded and the time between downloads vary according to the memory and storage capacity of the terminal and according to the system 100 requirements, such as channel bandwidth and channel line-up. When, for instance, the subscriber television system 100 provides access to hundreds or thousands of cable television channels, program information, including the programs, times, and the categories assigned to each channel, may be downloaded more often than when the system 100 provides fewer channels. There may be more frequent downloads of portions of the information, such as the channel table associating the categories assigned to each channel to the channels. The terminal 120 can also receive updated program information as needed, such as when the cable channel lineup is changed or when the category offerings or the categories assigned to a channel change. One of ordinary skill in the art will understand that various components of the program information, such as user assigned category information, could be stored either in the memory 250 or the headend 105.

Storage and transmission of the channel related category information can be accomplished in a variety of ways. By way of example, a channel table can be stored in memory 250 to minimize the amount of memory required and to facilitate efficient access to the categories assigned to the channels. Each category can be assigned a particular bit location in a fixed-size field comprising multiple bits, with each bit representing a distinctive category. Each field's binary number represents, by a "1" bit, the categories assigned to a respective channel. A byte of an n-byte category field could have category assignments for the individual bits as follows:

TABLE 1

Category bitmap

| Bit mask (binary) | Category |
|---|---|
| 00000001 | Pay-per-view |
| 00000010 | Local |
| 00000100 | Movies |
| 00001000 | News |
| 00010000 | Sports |
| 00100000 | Family |
| 01000000 | Religious |
| 10000000 | Mom's Channels |

According to the above table, a channel that has a respective field in the channel table represented in the memory 250 as "10110100" would be included in the categories of MOM'S CHANNELS, FAMILY, SPORTS, and MOVIES. A channel table associating the channel numbers to their respective binary numbers can be stored as channel information in the memory 250. The processor 210 can search the channel table and quickly determine the channels that have been assigned a selected category. The processor 210 can then organize the results of the search and cause the display to the subscriber of the program information for all channels to which a selected category has been assigned. In systems that allow the user to add or delete category assignments, the processor 210 can easily update the channel table to reflect any changes. In addition, renaming a category or changing a category title could be accomplished by updating the category name in the memory 250 associated with displaying the category title associated with a particular bit location. In a system 100 that allows the subscriber to name or rename categories, the ability to change just the category title of a category in a channel table simplifies the requirements of providing this service to the subscriber without overloading the processor.

In one embodiment, a single bit of the category field associated with a channel is employed as a flag to track subscriber operations that result in the modification of the category assignments. System updates to the channel table can bypass or treat as special the flagged channels. Exclusive OR (X-OR) operations and inversion operations can determine the category assignments that have been modified for a channel. The subscriber system 100 determines the treatment during channel table updating for the modified category assignments. The system 100 could ignore the flags, could prevent any changes to flagged channels, or provide rules controlling the hierarchy of any changes based on the subscriber changes. For example, when an X-OR indicates that a subscriber has added a LOCAL category assignment to a channel and a channel table update includes adding a SPORTS category assignment to the channel, the channel table update can leave the LOCAL category assignment and add the SPORTS category assignment. This allows the retention of subscriber modifications during channel table updates, such that the subscriber does not have to re-enter the subscriber-modified category assignments every time there is a channel table update. The ability to distinguish the subscriber modifications and maintain those modifications during channel table updating results in greater subscriber satisfaction with the services provided by subscriber television system 100.

The transmission of the table alone could be used in systems with insufficient memory 250 for storing all of the fields for each of the program records for each program on each channel over the set time period. The table would provide the subscriber with content relationships for the channels to which content categories had been assigned. In a related embodiment, the subscriber could reduce the channels being viewed to a subset of the entire channel line-up using a channel category selection. The system 100 could use the subscriber selected channel subset associated with the channels to which the channel category is assigned to download and store only the program information for channels in the selected subset.

A channel table can also be used in systems that store the program records in the headend 105. The channel table would allow the subscriber to narrow the data being retrieved from the program records database in the headend to records associated with the channels to which a selected category has been assigned.

Program information can be displayed to the subscriber in a number of ways. For instance, the display 235 can be driven to present a conventional program guide and to provide automatic scrolling of channels in numerical sequence along with the program names, descriptions, and times associated with the channels. Alternatively, a static display can be provided, and the subscriber can provide commands, such as via the transmitter 240, to scroll through the program information.

The terminal 120, according to the present invention, provides a mode in which program information associated with a user-selected channel category is presented, by channel, to the subscriber. The categories were previously assigned to the channels either by the subscriber, at the headend by the system operator, or by a content provider, such as ESPN assigning Sports to the ESPN and ESPN2 channels.

The subscriber can conveniently select a particular channel category, such as SPORTS or ANIMALS, and only program information associated with those channels to which the SPORTS category has been assigned will be subsequently presented during the time in which the terminal 120 is operating in the "category" mode. Presentation, it will be appreciated, can be accomplished in a number of ways, either at the option of the subscriber, the service provider, or both. When in the category mode, the terminal 120 could, for example, drive the display 235 to present an automatic or manual scrolling of only those channels to which the selected category has been assigned in a format similar to that of a conventional program guide. Alternatively, so that the subscriber can continue viewing the currently tuned channel, a browse banner of information could be provided in only a particular region of the display 235, such as a graphical rectangular overlay on the video of the tuned channel that contains textual and graphical program information. In either case, it will be understood that, once the subscriber has been presented with information about the channels that are included in the selected category, browsing can be further narrowed using other attributes, such as by time, title, or content category.

Blocking and locking access to individual channels is well known in the art. In one embodiment of the present invention, the channel table can be used to block access to a subset of channels by assigning a blocking channel category to the channels that are to be blocked from access. Access to blocked or locked channels and the associated program information typically requires the input of a personal identification code (PIN) or a password. A blocking category assignment can be used to block viewing or the display of related program information for the channels to which it is assigned. For example, a subscriber could select to block the ADULT category and all channels assigned the ADULT category would be blocked or restricted to PIN access only. The restriction could include blocking a subscriber from tuning, displaying video, and from displaying program information for the selected channels.

Figure 3:
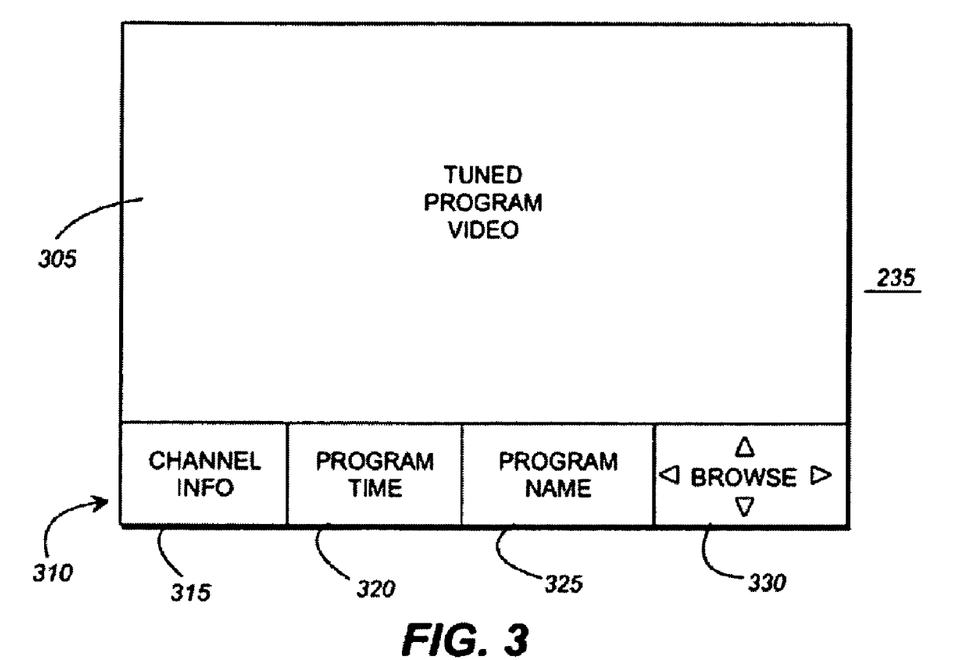
FIGS. 3-9 are illustrations of various browser screens that can be generated for display.
Figure 4:
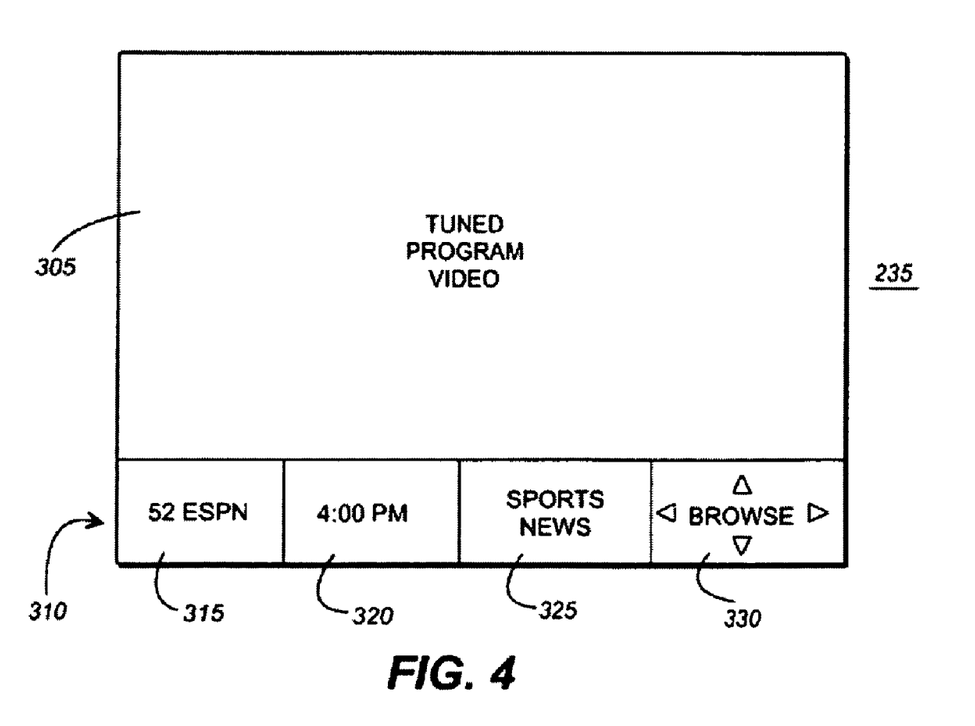
Figure 8:
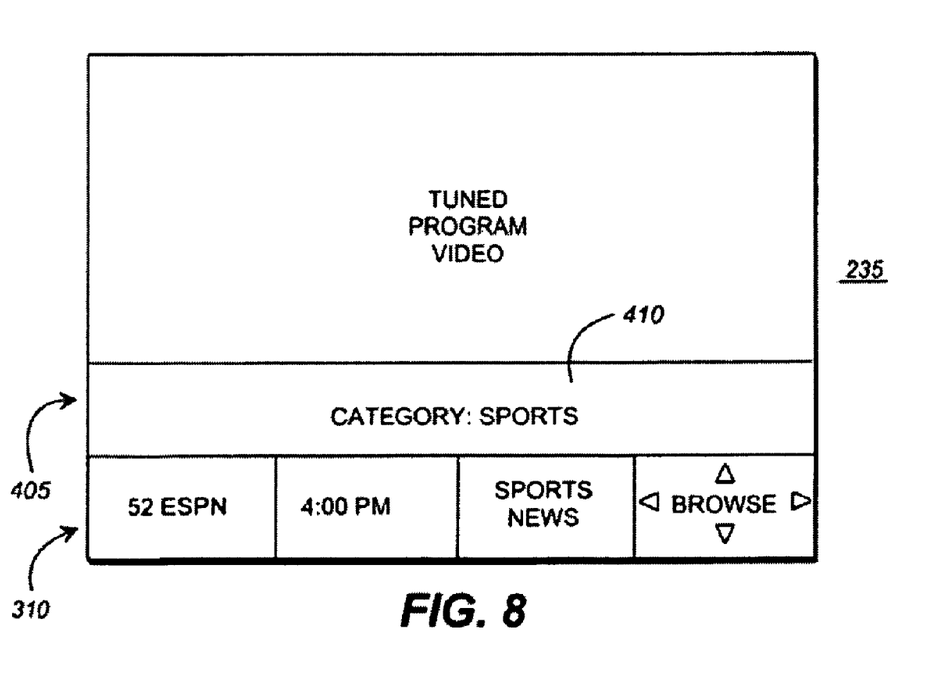
Figure 9:
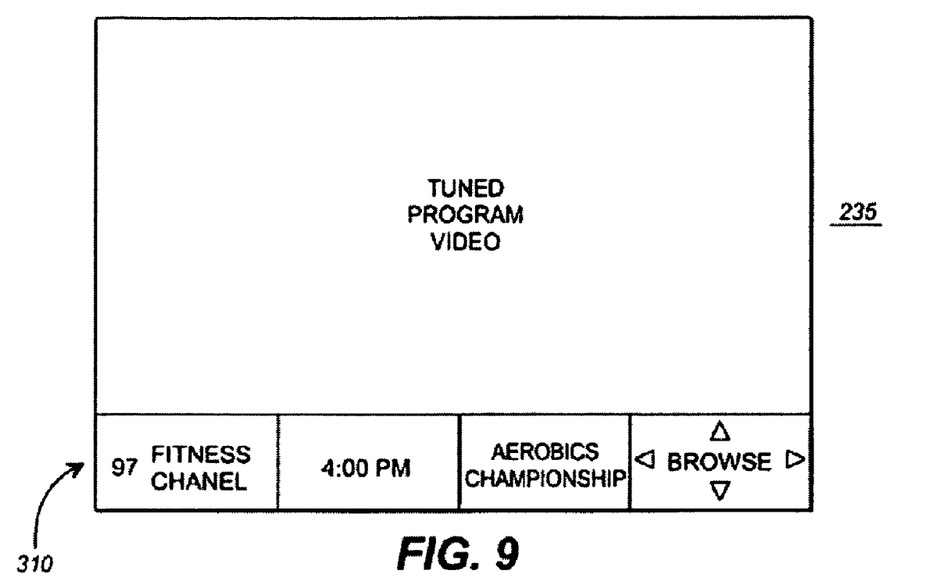
Figure 10:
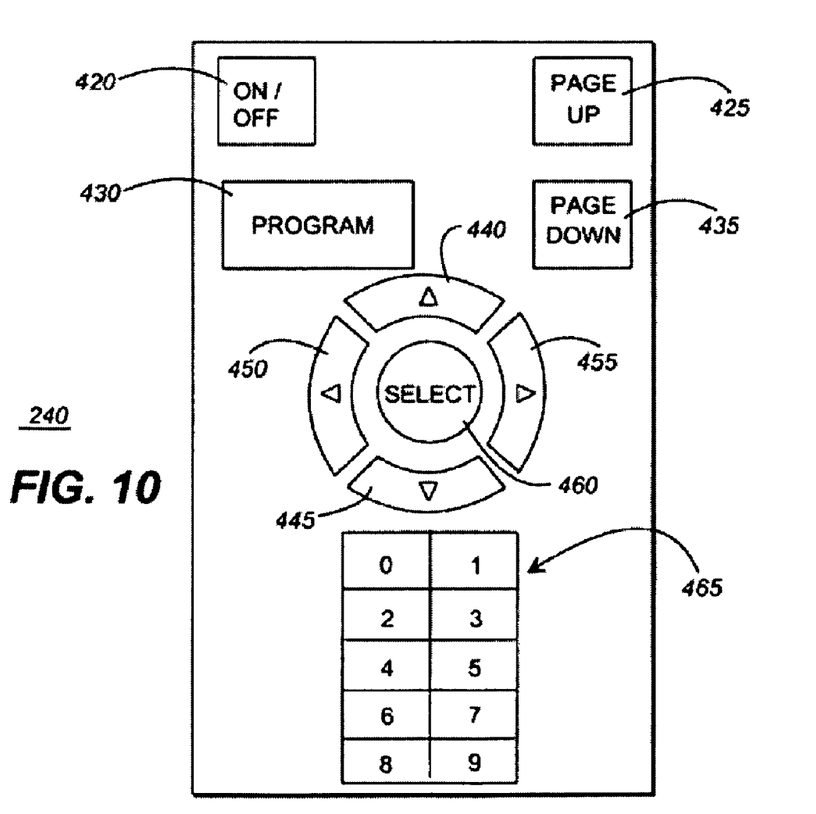
FIG. 10 is a top view of a transmitter, such as a remote control, that can be used by a subscriber to transmit commands to the set top terminal.

FIGS. 3-9 illustrate various screens of information, according to the present invention, that could be presented on the display 235 to provide program information to the subscriber. FIG. 10 is a top view of a simplified remote control transmitter 240 that can be used by the subscriber to command the presentation of the various screens. More advanced remote controls are available and would be compatible with the present invention. FIG. 3 shows the presentation of a browse banner 310 that can be presented simultaneously with a tuned program, as shown in the larger portion 305 of the display 235. In other words, the subscriber can conveniently browse other channels using the banner 310 while he or she is watching a program of interest. The browse banner 310 could be, for example, presented upon activation of any of the scrolling keys 440, 445, 450, 455 (FIG. 10). This can occur as a single machine state transition responsive to a single key activation from watching video to watching video with a program information banner in browse mode. The browse banner can initially display program information about the currently tuned program and channel responsive to the activation of a scrolling key or responsive to other activation methods, such as upon the second entry of the corresponding numerical channel number. The browse banner 310 preferably includes channel information 315, such as a description of the channel and its numerical indicator, program time 320, which could be to the nearest time interval (e.g., a half hour or an hour), program name 325, and any other relevant channel/program information. The program name 325 can include a short program description and the assigned categories for that channel or program. By way of example, and referring to FIG. 4, the browse banner 310 could initially be displayed with information about the currently tuned program, in which case the banner 310 may show that the user is currently watching a program entitled "Sports News" that began at 4:00 p.m. on Channel 52, which is ESPN. Additionally, an icon "browse" button bar 330 could be displayed to indicate to the subscriber that the browse mode is activated and that browsing in time or by channel can be performed by activating the scrolling keys 440, 445, 450, 455.

Figure 5:
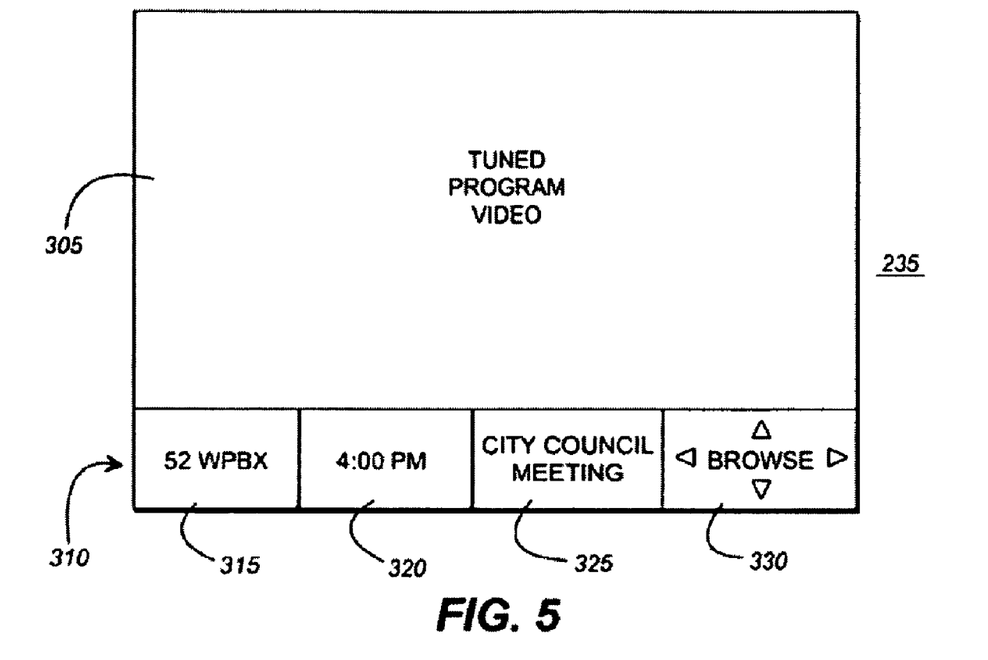
Figure 6:
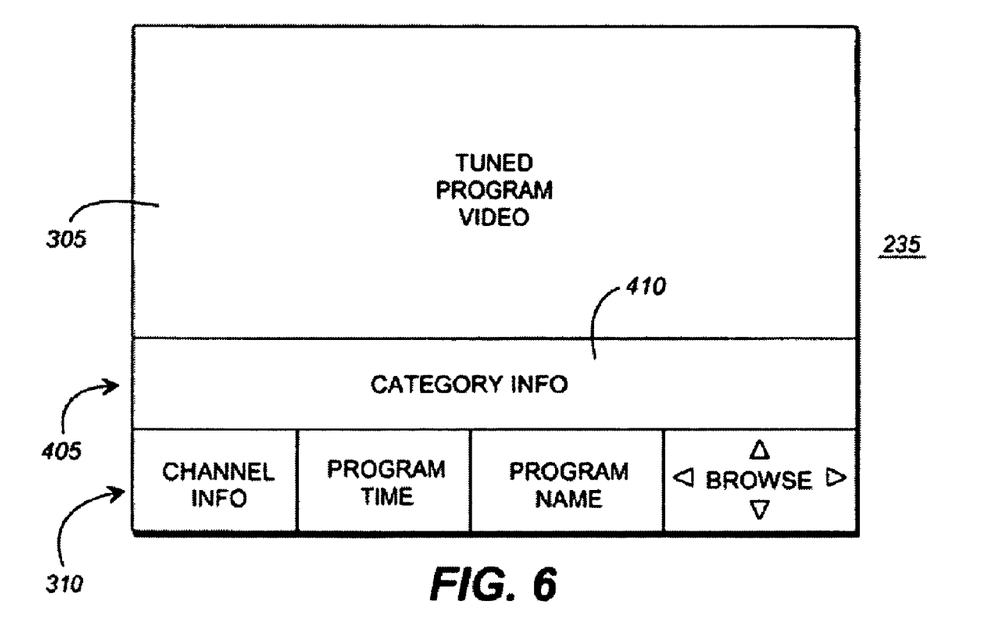
Figure 7:
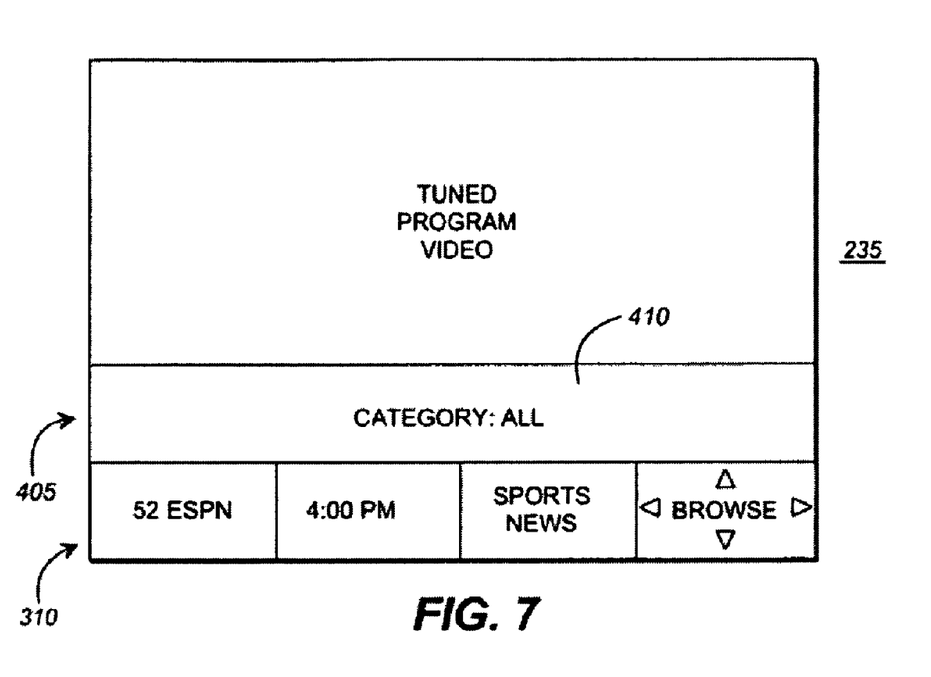

When the subscriber browses by channel, additional channels are displayed in numerical sequence (FIG. 5). As mentioned briefly above, however, the browsing process can be very tedious when a large number of channels are available. Therefore, the terminal 120 also provides a "category" mode, which could be invoked or changed by user actuation of other keys, such as the page up/down keys 425, 435 (FIG. 10). Preferably, the category mode is available during any time when the browse banner 310 is displayed. Upon entry into the category mode, the terminal 120 drives the display 235 to present a category banner 405 that includes category information 410 (FIG. 6) indicative of a category that is currently selected. Upon initial activation or if no category is selected, a default category of ALL (FIG. 7) may be indicated to the subscriber. In an alternate embodiment, the subscriber or the system 100 operator can configure the displayed category to one of several settings, such as the last selected or viewed category or to a preset initial category that is always displayed first. The subscriber can change the selected category by scrolling through the available categories via assigned keys, such as page up/down keys 425, 430, of the remote control transmitter 240. For instance, the subscriber can scroll through the available categories until the category banner 405 shows SPORTS as the selected category (FIG. 8). When the subscriber then begins browsing the program information again, such as by activating the scrolling keys, the program information for the next channel assigned the selected SPORTS category will be presented, as shown in FIG. 9. The user could also arrange the display order of channels to which a particular category is assigned, such that channel 9 would appear first followed by channels 5, 7, 2, 301, 66, and 4. In an alternative embodiment, the user could also simply stop scrolling on the SPORTS category selection and the terminal 120, after a set delay, would enter a machine state for displaying the SPORTS category program information and start causing the display of the program information for the first ordered SPORTS channel without requiring any additional user input.

For purposes of browsing, program information for channels not included in the selected category is skipped so that the subscriber can conveniently display only program information for those channels in which he or she is currently interested. It will be appreciated that the category feature of the present invention allows the subscriber to ignore program information for categories that are not of interest during the current browse by category session and to quickly locate a particular channel or program without having to view program information for each and every channel provided by the subscriber television system 100. In addition with a subset of the channels to browse, browsing in time can be focused on the associated channels and not require scanning through the entire channel line-up for each time period. As a result, the subscriber television system 100 and terminal 120 according to the present invention provide a means by which the subscriber can quickly locate channels of interest even in a field of hundreds or thousands of channels and easily locate programs of interest being shown at different time periods.

Figure 13:
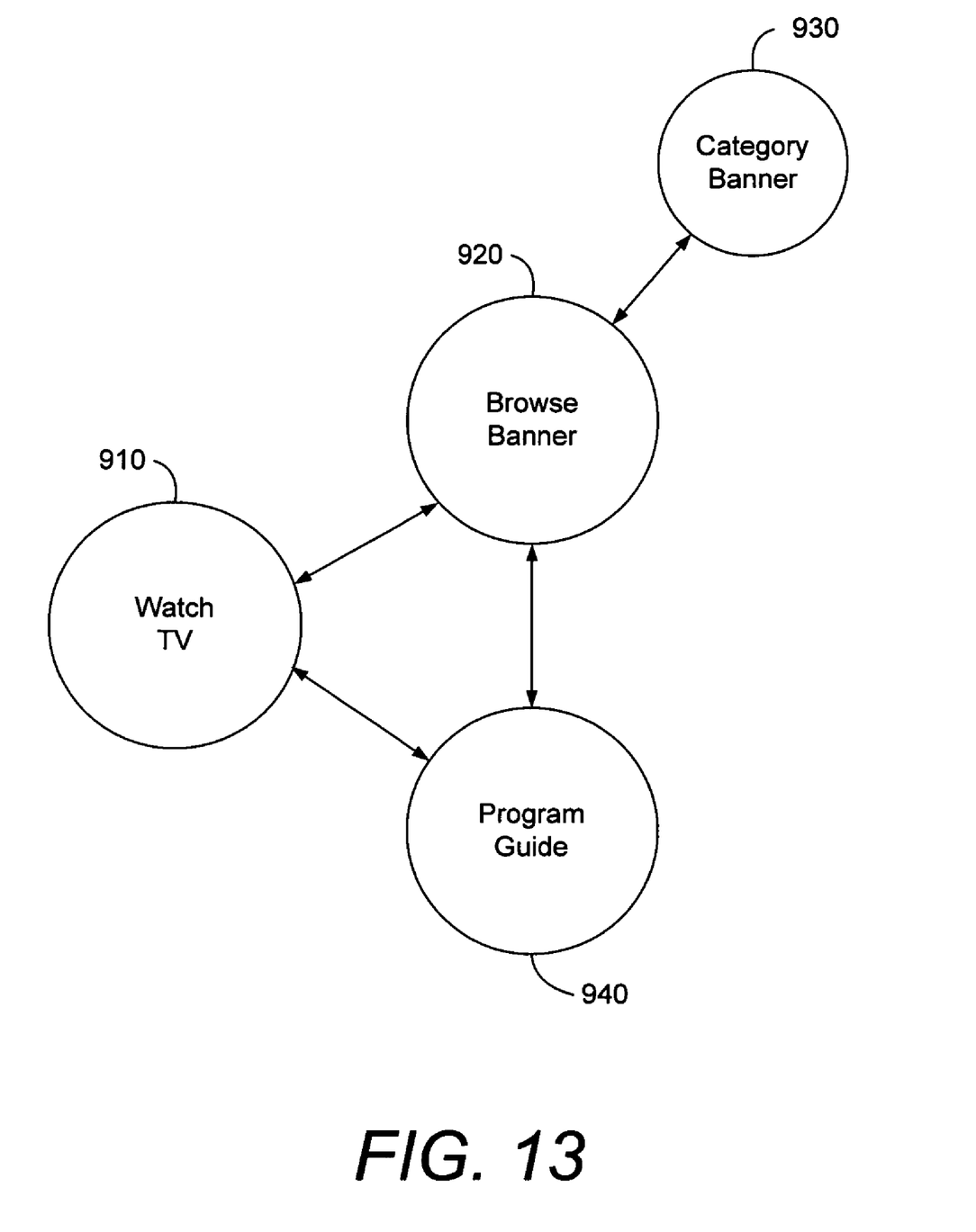
FIG. 13 is a state diagram illustrating the machine state changes of the processor included in the set top terminal.

The assignment of categories to channels allows a simplified state change from viewing full screen video to viewing video and program information in a browse banner. Referring to FIG. 13, the terminal 120 normally starts in the Watch TV 910 machine state, after initialization. The user could elect to view program guide information and switch to a Program Guide 940 machine state. Upon a single activation of a browse key on a remote control, the terminal 120 can change to a Browse Banner 920 state in a single machine state change from either the Watch TV 910 machine state or the Program Guide 940 machine state. The Browse Banner 920 machine state allows the user to watch television programming, typically the currently tuned channel, and to browse program information simultaneously. Because of the processor cycle requirements of other methods that search the entire program record database, this type of state change was done as two machine state changes to limit the processor cycle requirements and allow the processing and storage of program information into a short term memory in a menu machine state and then switching to the display of the information while processing video in a browse machine state. The present invention provides a more efficient use of the processor cycles and the memory required to store the results.

The organization of information based on channels to which categories have been assigned allows a single machine state change and the simultaneous processing and display of channel information and video. The channel information can include information from the program records, but the search for that program record information is restricted to records associated with a few channels being displayed at a time or with a few channels associated with a category. Browsing is automatically associated with the channel assigned categories, including the ALL category.

In addition, the Category Banner 930 machine state can be a single machine state change from the Browse Banner 920 state. In an alternate embodiment, a system 100 could require a category selection prior to the display of a browse banner or set a default category other than an ALL type category, in which case the activation of the browsing machine state would activate the browsing by category machine state in a one step activation.

An additional advantage of assigning categories to channels is that the subset of channels to which a particular category is assigned can be used to limit a program content category search of the program record database to just the subset of associated channels. In one embodiment, only the program records for the channels assigned the MOVIE channel category are searched in the database for programs that have been assigned a MOVIE content category. A listing of the current and upcoming movie show times and associated channels is provided. This provides the same results that current program record category searches yield with the use of less processor cycles. Related to the extensive requirements for searching all of the thousands of program records in a program record database, the terminal 120 can quickly and simultaneously search and process the program records based on the channel table category assignments. In addition, by first accessing a channel table, the processor can increase the efficiency of the retrieval from memory of the program record information by restricting it to only those records in the program record information database that are relevant to channels assigned the category associated with the current displayed browse banner.

As shown in FIGS. 3-9, the subscriber can easily select a category and then browse program information for channels to which the selected category is assigned, all without interrupting viewing of a tuned program. Other presentation methods could, however, also be used. For instance, once the category is selected, the subscriber could again select to view program information in a guide-like format. In this case, the transition from Browse Banner machine state 920 to Program Guide machine state 940 results in the program guide information being presented on the entire display 235, but including only program information associated with the category selected in or associated with the Browse Banner machine state 920. The guide could then be automatically or manually scrolled to show the subscriber only the subset of information associated with the selected category, thereby reducing the amount of time and effort required to locate a particular channel or program. In addition, the tuning in the Watch TV machine state 910 could be restricted to the subset of channels to which a selected category has been assigned.

As mentioned above, a remote control transmitter 240, such as that shown in FIG. 10, could provide user inputs. Such a transmitter 240 might include an on/off key 420, a program key 430 for inputting programming commands, page up/down keys 425, 435, scrolling keys 440, 445, 450, 455, a select key 460 for selecting a highlighted option, and a numerical keypad 465 for inputting numerical information. However, other input means could alternatively be provided. For instance, a different remote transmitter 240 could be used to highlight and select menu options presented to the subscriber on the display 235, keys on the terminal 120 itself could be used, or commands could be entered via a wired or wireless keyboard, via a keypad, via a computer coupled to the terminal 120, or via a voice-activation device.

Figure 11A:
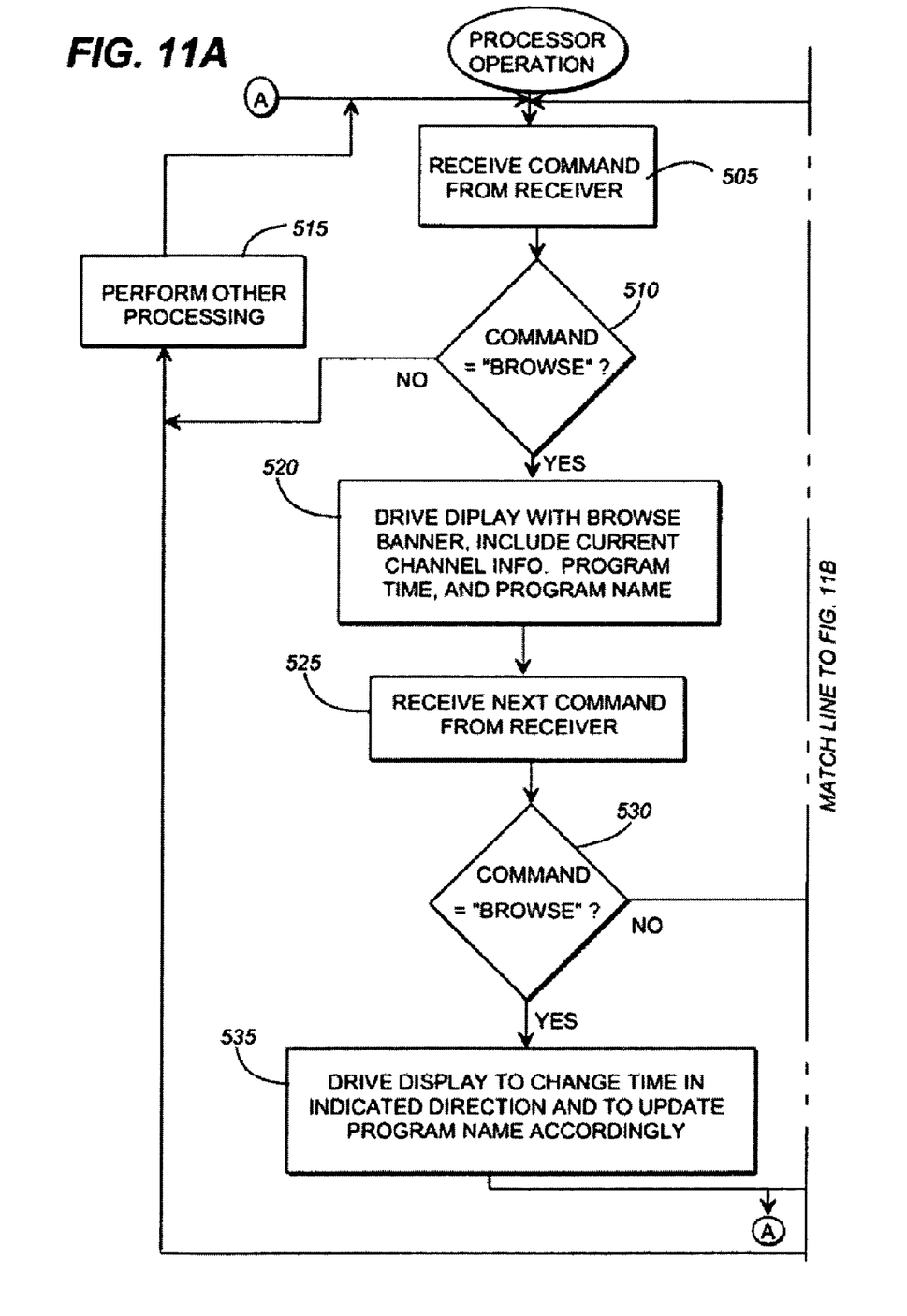
FIG. 11 is a flowchart illustrating a method of operating a processor included in the set top terminal.
Figure 11B:
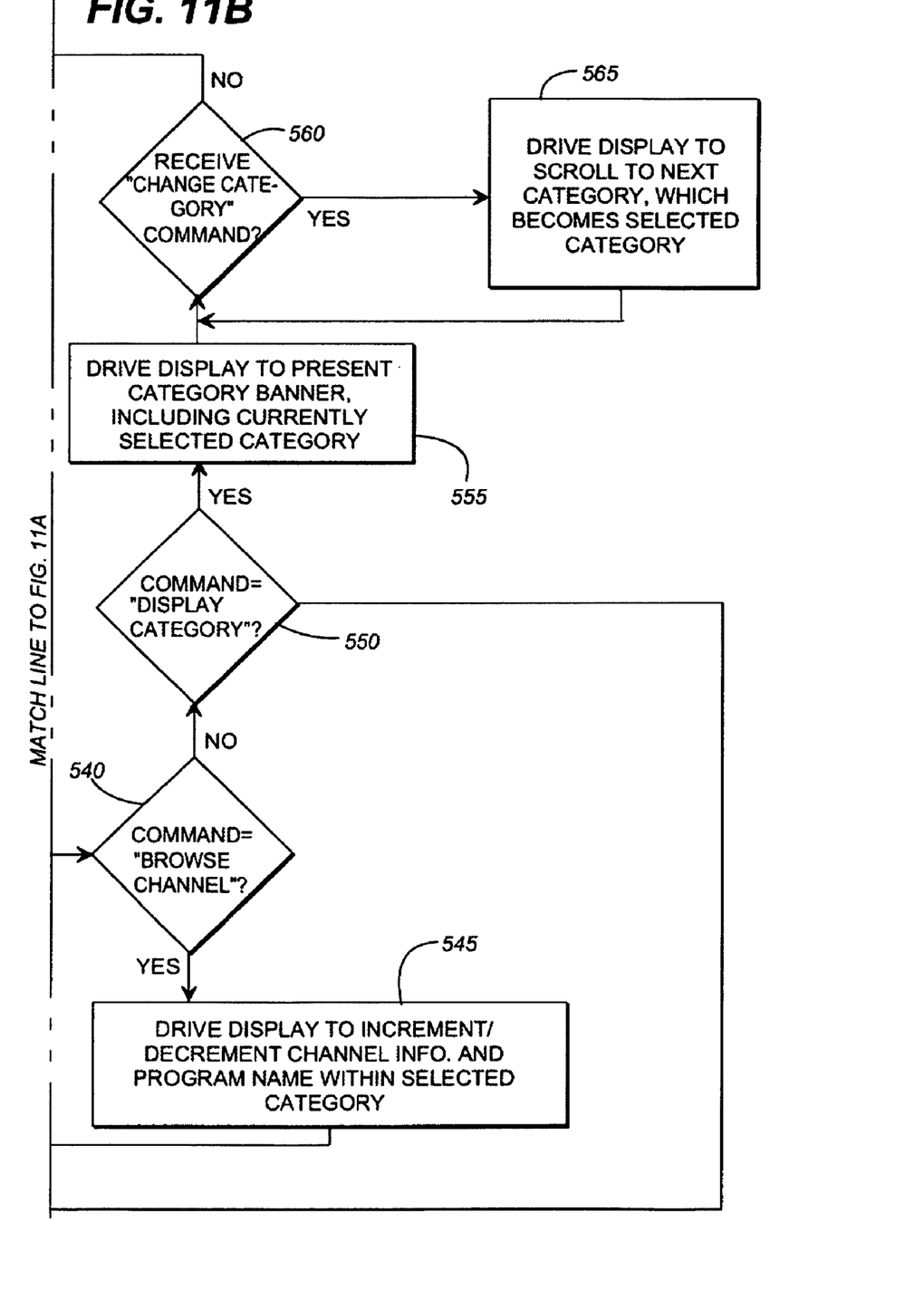

Referring next to FIG. 11, a flowchart illustrates a method of operating the processor 210 (FIG. 2) of the terminal 120 for providing category functions. When, at step 505, the processor 210 receives an input command from the receiver 220, it determines, at step 510, whether the command is a browse command. The processor 210 references the memory 250 and interprets the input command under the control of and with program execution in processor 210. If the command is not a browse command, other processing indicated by the command is performed, at step 515, in a conventional manner. If the browse command has been received, the display 235 is driven, at step 520, to present the browse banner with multiple displayable fields populated with program information, including current channel information, program time, and program name for the currently selected category. If the user has not previously selected a category, the default category is preferably set to ALL. Furthermore, it will be appreciated that, at the option of the subscriber and/or the service provider, the browse banner could either default to ALL, have an initial displayable category preset by either the system operator or the user in an interactive configuration session, be configured or retain knowledge of the last selected category, in which case, the browse banner would launch showing channel information associated with a channel to which the last selected category is assigned.

When, at step 525, another command is received from a user, and the command is determined, at step 530, to be a command to browse in time, the display 235 is driven, at step 535, to change to the next time interval on the browse banner for the currently selected category in the indicated direction. As mentioned, this change could be to the next nearest hour or half hour time interval. Alternatively, since a channel is categorized as a whole, browsing in time could automatically advance the subscriber to the time of the next program on the channel currently displayed on the browse banner. In any event, browsing in time may, of course, necessitate a change in program name. When, at step 540, the command is determined to be a command to browse by channel, the browse banner is updated, at step 545, to present the channel information and program name associated with the next channel assigned the selected category and to populate the browse banner fields with program information for that channel. If, instead, the command is a "display category" command, at step 550, the display 235 is driven, at step 555, to display the category banner that shows the currently selected category. The subscriber can then, at steps 560, 565, change the selected category by scrolling through the available categories using, for example, the page up/down keys 425, 435. The category mode, as well as the browse mode, could be exited by reception of a known command or simply by expiration of a period of time in which no browse or category command is received.

It will be understood that category selection of channel information by the subscriber is not necessarily limited to the time during which the terminal 120 is in the browse mode. Instead, the category could be selected, using any known command or series of commands, prior to viewing any program information by channel. In such a case, if the subscriber selects to be presented with the browse banner, it could appear with the category already selected. If, on the other hand, the subscriber chooses to display a program guide after selection of the channel category, the guide can launch showing only the channels included in the selected category and omitting channels that are not included in the selected category. In some systems the subscribers may restrict the tuning of channels to a selected category. The assignment of categories to channels provides an easy and simple method to perform the assignment and tracking of the categories.

Figure 12:
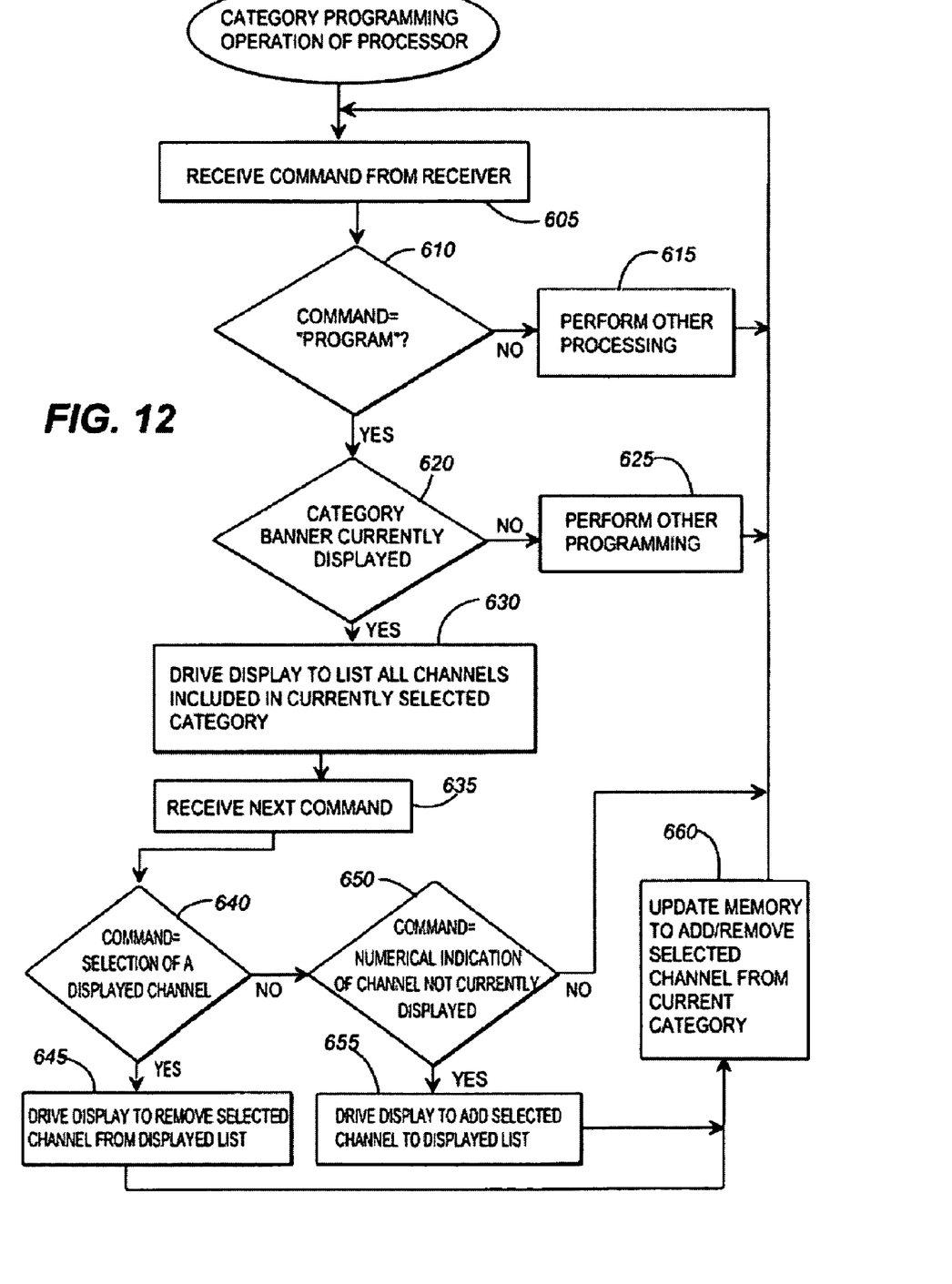
FIG. 12 is a flowchart illustrating a programming operation of the processor for adding and deleting category assignments.

FIG. 12 is a flowchart illustrating a programming operation of the processor 210 for adding and deleting category assignments. When, at step 605, the processor 210 receives a command from the receiver 220, it determines, at step 610, whether the command indicates that programming of the terminal 120 is to be performed. If not, other processing is performed, at step 615, in a conventional manner. When, at step 610, a program command is received, the processor 210 determines, at step 620, whether the command is a category programming command. This could be done, for instance, by determining whether the category banner is currently displayed, in which case activation of the program key 430 (FIG. 10) could be associated with the category programming command or with an interactive configuration session. If the command is not a category programming command, another programming function is performed, at step 625. If it is a category programming command, the display 235 is driven, at step 630, to list all channels to which a selected category is currently assigned. When, at steps 635, 640, the next command is a command that selects one of the displayed channels, the selected channel is, at steps 645, 660, removed from the displayed list and the category assignment for that channel is updated by updating the memory 250. When, at steps 635, 650, the command is a command to add a category assignment for a channel, both the display 235 and the memory 250 are updated, at steps 655, 660, to indicate that the selected channel has now been assigned the category. Adding the category assignment to a channel could be done, for instance, by activation of the appropriate keys of the numerical keypad 465 (FIG. 10). It should be noted that from a display perspective the channels might appear to be assigned to categories. The user selects a category and is presented with a list of channels. This may be a more familiar concept for the user. The user would then select or remove channels from the list assuming that they are changing channel assignments. In fact, they would be changing the category assigned to each selected channel. The actual assignment of the category to the channel could be tracked only in a channel table used by the processor 210 for organizing the categories and channels.

It will be appreciated that the methods described in FIGS. 11 and 12 for selecting categories and programming channels to which the categories are assigned can be performed in many other ways and that the exact steps illustrated in FIGS. 11 and 12 need not be followed. Category selection and programming could, for instance, be accomplished by typing in a category name via an alphanumeric keyboard, by inserting a data card, such as a smart card or a PC card, into a slot (not shown) of the terminal 120 or of a computer coupled to the terminal 120, or by activating a scrolling pick-list of all available channels and/or categories. The channel table is one embodiment of the present invention and those skilled in the art could perform the functions of the channel table using other formats and with additional information, such as storing channel information as a program record in the program record database that is accessed first to retrieve the channel category assignments. The Browse Banner and Category Banner can be displayed in a variety of positions on the display and can include more or less information, such as including the assigned category or including a short description of the program in the Browse Banner. In addition the subscriber television system 100 could be any of a multitude of configurations well known in the art, including a microwave transmission system or a digital subscriber line (DSL) network serviced by a local telephone service provider.

Although the present invention has been described in one embodiment as the assignment of a content-type channel category to a channel, those skilled in the art will recognize that other system related parameters could be assigned to a channel as an entity, parameters such as cost, other non-content related categories, user selected designations, or information associated with the availability of other services, such as internet associated channels and electronic-commerce related channels.

It should be emphasized that the above-described embodiments of the present invention are merely possible examples of the implementations, merely set forth for a clear understanding of the principles of the invention. Many variations and modifications may be made to the above-described embodiments of the invention without departing substantially from the spirit of the principles of the invention. All such modifications and variations are intended to be included herein within the scope of the disclosure and present invention and protected by the following claims.

What is claimed:

1. In a subscriber television system with a plurality of channels, a method of assigning a category to, or removing from the category, at least one channel of the plurality of channels, the method comprising:
   displaying at least a portion of the plurality of channels on a display screen, the displayed portion associated with the category and comprising the at least one channel;
   receiving a user input corresponding to a selection of the at least one channel from the displayed portion;
   responsive to the selection, removing the at least one channel from the displayed portion, the removal corresponding to a disassociation of the selected channel from the category and removal from the display screen;
   assigning the category to a second channel by:
   receiving a second user input corresponding to entry of the second channel to the displayed portion;
   changing a value of a bit corresponding to a particular bit location within a binary number, the particular bit location associated with the category and the binary number associated with the second channel; and
   updating a table associating the binary number to the second channel, the binary number associating the category to the second channel; and
   assigning an additional category to the second channel by:
   displaying at least a second portion of the plurality of channels, the displayed second portion associated with the additional category and excluding the second channel;
   receiving a third user input corresponding to entry of the second channel to the displayed second portion;
   adding the second channel to the displayed second portion, the adding comprising assigning the additional category to the second channel by changing a value of a bit at a particular bit location associated with the additional category in the binary number associated with the second channel to create a new binary number associated with the second channel; and
   updating the table with the new binary number associated with the second channel.

2. The method of claim 1, wherein the table is stored in a headend of the subscriber television system, and further comprising receiving at a subscriber terminal the table from the headend prior to the updating.

3. The method of claim 1, wherein removing further comprises:
   changing a value of a bit at a particular bit location associated with the category in a binary number associated with the at least one channel to create a new binary number associated with the at least one channel; and updating a table with the new binary number associated with the channel.

4. The method of claim 1, further comprising, prior to displaying, searching a database of program records, wherein the searching is restricted by a table to program records associated with the portion of the plurality of channels to which the category is assigned.

5. The method of claim 1, wherein receiving the user input includes receiving user input from at least one of a remote control, a keyboard, a data card, or a personal computer.

6. The method of claim 1, further comprising assigning a parameter to the second channel.

7. The method of claim 6, wherein a parameter comprises one or a combination of cost, other non-content related categories, user selected designations, or information associated with the availability of other services.

8. In a subscriber television system with a plurality of channels, a method of assigning a category to, or removing from the category, a channel among a plurality of channels, the method comprising:

displaying at least a portion of the plurality of channels on a display screen, the displayed portion associated with the category and excluding the channel from the display screen; and receiving a user input corresponding to entry of the channel to the displayed portion;

adding the channel responsive to the user input, the adding further comprising assigning the category to the channel by:

changing a value of a bit corresponding to a particular bit location within a binary number, the particular bit location associated with the category and the binary number associated with the channel; and updating a table in a memory device, associating the binary number to the channel, the binary number associating the category to the channel; and assigning an additional category to the channel by:

displaying at least a second portion of the plurality of channels, the displayed second portion associated with the additional category and excluding the channel;

receiving a second user input corresponding to entry of the channel to the displayed second portion;

adding the channel to the displayed second portion, the adding comprising assigning the additional category to the channel by changing a value of a bit at a particular bit location associated with the additional category in the binary number associated with the channel to create a new binary number associated with the channel; and updating the table with the new binary number associated with the channel.

9. The method of claim 8, wherein the table is stored in a headend of the subscriber television system, and further comprising receiving at a subscriber terminal the table from the headend prior to the updating.

10. The method of claim 8, further comprising:

displaying the portion of the plurality of channels, the displayed portion associated with the category and including the channel responsive to the adding;

receiving a third user input corresponding to selection of the channel in the displayed portion; and removing the channel responsive to the third user input the removal corresponding to a disassociation of the selected channel from the category.

11. The method of claim 10, wherein removing further comprises:

changing the value of the bit at the particular bit location associated with the category in the binary number associated with the channel to create a new binary number associated with the channel; and updating the table with the new binary number associated with the channel.

* * * * *